(12) United States Patent
Teraya et al.

(10) Patent No.: US 7,921,565 B2
(45) Date of Patent: Apr. 12, 2011

(54) WORKING FLUID INJECTION APPARATUS, METHOD OF INJECTING WORKING FLUID, AND METHOD OF MANUFACTURING FLUID DYNAMIC PRESSURE BEARING

(75) Inventors: Junji Teraya, Chiba (JP); Yutaka Makishima, Chiba (JP); Naoki Nemoto, Chiba (JP)

(73) Assignee: Seiko Instruments Inc. (JP)

( * ) Notice: Subject to any disclaimer, the term of this patent is extended or adjusted under 35 U.S.C. 154(b) by 1017 days.

(21) Appl. No.: 11/661,637

(22) PCT Filed: Aug. 30, 2005

(86) PCT No.: PCT/JP2005/015730
§ 371 (c)(1),
(2), (4) Date: Apr. 27, 2007

(87) PCT Pub. No.: WO2006/027970
PCT Pub. Date: Mar. 16, 2006

(65) Prior Publication Data
US 2008/0098602 A1 May 1, 2008

(30) Foreign Application Priority Data
Sep. 7, 2004 (JP) ................................. 2004-259923

(51) Int. Cl.
*B21K 1/76* (2006.01)
(52) U.S. Cl. ....... 29/898.1; 29/724; 29/898.02; 184/5.1; 184/7.4; 222/559

(58) Field of Classification Search .................... 29/724, 29/898.02, 898.07, 898.1; 184/5.1, 7.4, 6.22, 184/64; 141/5, 8; 222/509, 559, 561, 647, 222/495
See application file for complete search history.

(56) References Cited

U.S. PATENT DOCUMENTS

| | | | | |
|---|---|---|---|---|
| 1,747,598 | A | * | 2/1930 | Popp .............................. 251/210 |
| 2,315,031 | A | * | 3/1943 | Wiegand ......................... 251/78 |
| 3,469,825 | A | * | 9/1969 | Dubois ............................ 261/71 |
| 5,402,918 | A | * | 4/1995 | Nishiyama et al. ........... 222/152 |
| 5,524,728 | A | * | 6/1996 | Williams et al. ................ 184/29 |
| 6,733,180 | B2 | * | 5/2004 | Nakamura ..................... 384/100 |

(Continued)

FOREIGN PATENT DOCUMENTS

JP 2001-165153 A 6/2001

(Continued)

*Primary Examiner* — David P Bryant
*Assistant Examiner* — Ryan J Walters
(74) *Attorney, Agent, or Firm* — Adams & Wilks (57) ABSTRACT

A working fluid injection apparatus has an upper chamber that stores a working fluid and a lower chamber that removably receives a bearing unit having a housing and a shaft that is inserted in the housing to form between the shaft and the housing a gap into which the working fluid is to be injected. A partition divides the upper chamber and the lower chamber into top and bottom parts, respectively. A first exhaust system brings the inside of the upper chamber to a decompressed state. A second exhaust system brings the inside of the lower chamber to a decompressed state. A valve unit opens and closes an internal cavity of the lower chamber relative to an external environment. A tapered hole is formed in the partition and communicates the upper and lower chambers to one another. A tapered shaft is inserted into the tapered hole from the upper chamber. A shaft drive unit moves the tapered shaft in the axial direction in the tapered hole.

19 Claims, 8 Drawing Sheets

U.S. PATENT DOCUMENTS

| | | | |
|---|---|---|---|
| 7,043,839 B2 * | 5/2006 | Hayashi et al. | 29/898.02 |
| 7,328,511 B2 * | 2/2008 | Misu et al. | 29/898.02 |
| 7,343,682 B2 * | 3/2008 | Sumi et al. | 29/898.1 |
| 7,344,002 B2 * | 3/2008 | Neumann et al. | 184/5.1 |
| 2003/0012465 A1 | 1/2003 | Nakamura | |
| 2003/0221317 A1 * | 12/2003 | Kaimi et al. | 29/898.02 |
| 2004/0020721 A1 | 2/2004 | Iwamoto et al. | |
| 2004/0107577 A1 * | 6/2004 | Hayashi et al. | 29/898.02 |
| 2007/0175704 A1 * | 8/2007 | Teraya et al. | 184/5.1 |

FOREIGN PATENT DOCUMENTS

| | | |
|---|---|---|
| JP | 2002-5170 A | 1/2002 |
| JP | 2002-174243 A | 2/2002 |
| JP | 2003-314791 A | 11/2003 |

\* cited by examiner

(METHOD OF OPENING AND CLOSING FROM ABOVE BY A TAPER)

(METHOD OF OPENING AND CLOSING FROM BELOW BY A TAPER)

WORKING FLUID INJECTION APPARATUS, METHOD OF INJECTING WORKING FLUID, AND METHOD OF MANUFACTURING FLUID DYNAMIC PRESSURE BEARING

CROSS-REFERENCE TO RELATED APPLICATIONS

This application is a U.S. national stage application of International Application No. PCT/JP2005/015730, filed Aug. 30, 2005, claiming a priority date of Sep. 7, 2004, and published in a non-English language.

TECHNICAL FIELD

The present invention relates to a working fluid injection apparatus and a method of injecting working fluid. In particular, it relates to a working fluid injection apparatus for injecting working fluid into very small gaps or the like, and a method of injecting working fluid. Furthermore, the invention relates to a method of manufacturing a fluid dynamic pressure bearing.

BACKGROUND ART

Up to now, there is known, as a method of injecting working fluid of a fluid dynamic pressure bearing that is used for a recording medium driving device etc., a method disclosed in, for example, Patent Document 1.

The method for injecting working fluid disclosed in Patent Document 1 is a vacuum injection method, wherein a bearing unit, in which an annular cavity having a capacity equal to an appropriate amount is formed at an open end of a gap between a housing and a shaft, is brought to a decompressed state so as to exhaust air from the inside of the bearing unit; a working fluid is dropped into the cavity in the decompressed state and stored therein; and thereafter, the decompressed state is released so that the stored working fluid is injected into the gap of the bearing unit by utilizing the difference in pressure between the inside and the outside of the bearing unit.

In this injection method, since it is necessary to drop a working fluid accurately into a very small region between the housing and the shaft, the working fluid is dropped using a dispenser having a slender tubular injection nozzle.

Patent Document 1:

Japanese Unexamined Patent Application, First Publication No. 2002-174243 (page 3, FIG. 1, etc.)

DISCLOSURE OF INVENTION

However, since the supply of the working fluid in the dispenser is started and stopped on the source side of the nozzle, when the dispenser is once used to drop the working fluid, the slender tubular injection nozzle remains full of working fluid. In this case, the injection nozzle is located in the same vacuum chamber as the bearing unit, and is located there in both the decompressed state and the atmospheric pressure state. Therefore, if the vacuum chamber, which has been brought to the atmospheric pressure state, is brought to the decompressed state again, there is an inconvenience in that even in a state in which the dispenser does not operate, the working fluid in the injection nozzle leaks from the injection nozzle due to the difference in pressure.

In this case, the bearing unit is located under the injection nozzle, and the leaking excess working fluid is supplied into the gap of the bearing unit. Therefore, there is a problem in that the amount of working fluid injected cannot be controlled accurately.

Furthermore, in order to prevent this, when the vacuum chamber is sealed to perform the decompression operation, the bearing unit must be located at a position away from beneath the injection nozzle of the dispenser. Therefore, there is a problem in that the construction of the apparatus and the process for injecting the working fluid become complicated.

The present invention has been made in view of the above circumstances, and therefore has an object to provide: a working fluid injection apparatus that can prevent working fluid from leaking into the vacuum chamber during processes other than the process for injecting working fluid, using a simple construction, and can inject an appropriate amount of working fluid into an object that is to receive the injection such as a bearing unit; a method of injecting working fluid; and a method of manufacturing a fluid dynamic pressure bearing.

In order to achieve the above object, the present invention provides the following means.

The present invention provides a working fluid injection apparatus comprising: an upper chamber that stores a working fluid; a lower chamber that houses so that it can be inserted and removed, an object that is to receive the injection that has a gap into which the working fluid is injected; a partition that divides the upper chamber and the lower chamber into top and bottom parts; a first exhaust system that exhausts air in the upper chamber to a decompressed state; a second exhaust system that exhausts air in the lower chamber to a decompressed state; a valve unit that opens and closes an internal cavity of the lower chamber relative to an external environment; a tapered hole which is formed in the partition, and which communicates between the two chambers; a tapered shaft which is inserted into the tapered hole from the upper chamber; and a shaft drive unit that moves the tapered shaft in the tapered hole in the axial direction.

According to the working fluid injection apparatus of the present invention, the working fluid is stored in the upper chamber, and it is maintained in a decompressed state by the operation of the first exhaust system. Furthermore, the tapered shaft is inserted into the tapered hole to close the tapered hole, so that the working fluid does not leak from the upper chamber to the lower chamber. Accordingly, the working fluid is stored in a degassed state in the upper chamber.

On the other hand, with the lower chamber opened, by positioning the object that is to receive the injection directly under the tapered hole therein, closing the valve unit to make the lower chamber into a closed state, and operating the second exhaust system, the air in the internal cavity of the lower chamber is exhausted to bring the lower chamber to the decompressed state. In this state, by operating the shaft drive unit to move the tapered shaft in the axial direction, the gap between the tapered shaft and the tapered hole is expanded, and hence the working fluid flows from the upper chamber down into the lower chamber through the gap.

Since the object that is to receive the injection is positioned directly under the tapered hole, the working fluid flowing down is dropped such that it covers the entrance of the gap of the object that is to receive the injection, and when the required quantity has been dropped, the shaft drive unit operates again to close the tapered hole by the tapered shaft. Then, the valve unit is opened in this state, and by raising the pressure in the lower chamber gradually to the atmospheric pressure, the working fluid is sucked into the gap of the object that is to receive the injection, by the press difference on the inside and outside of the object that is to receive the injection, and is injected into the interior.

In this case, according to the working fluid injection apparatus of the present invention, since it does not have a slender injection nozzle as in Patent Document 1, no undropped working fluid remains in the lower chamber, so it is possible to prevent working fluid from leaking out due to the change in the atmospheric pressure in the lower chamber. Therefore, it is possible to inject working fluid that flows in the gap between the tapered shaft and the tapered hole due to the drive of the shaft drive unit so that its quantity is measured correctly, into the object that is to receive the injection. Furthermore, when the object that is to receive the injection is positioned in the lower chamber, it can be positioned directly under the tapered hole. Therefore, it is possible to construct the apparatus and the injection process simply, and hence it is possible to reduce the cost required for the equipment and the product.

The present invention has been made in view of the above circumstances, and therefore has an object to provide: a working fluid injection apparatus that can prevent working fluid from leaking into the vacuum chamber during processes other than the process for injecting working fluid, using a simple construction, and can inject an appropriate amount of working fluid into an object that is to receive the injection such as a bearing unit; a method of injecting working fluid; and a method of manufacturing a fluid dynamic pressure bearing.

In order to achieve the above object, the present invention provides the following means.

The present invention provides a working fluid injection apparatus comprising: an upper chamber that stores a working fluid; a lower chamber that houses so that it can be inserted and removed, an object that is to receive the injection that has a gap into which the working fluid is injected; a partition that divides the upper chamber and the lower chamber into top and bottom parts; a first exhaust system that exhausts air in the upper chamber to a decompressed state; a second exhaust system that exhausts air in the lower chamber to a decompressed state; a valve unit that opens and closes an internal cavity of the lower chamber relative to an external environment; a tapered hole which is formed in the partition, and which communicates between the two chambers; a tapered shaft which is inserted into the tapered hole from the upper chamber; and a shaft drive unit that moves the tapered shaft in the tapered hole in the axial direction.

According to the working fluid injection apparatus of the present invention, the working fluid is stored in the upper chamber, and it is maintained in a decompressed state by the operation of the first exhaust system. Furthermore, the tapered shaft is inserted into the tapered hole to close the tapered hole, so that the working fluid does not leak from the upper chamber to the lower chamber. Accordingly, the working fluid is stored in a degassed state in the upper chamber.

On the other hand, with the lower chamber opened, by positioning the object that is to receive the injection directly under the tapered hole therein, closing the valve unit to make the lower chamber into a closed state, and operating the second exhaust system, the air in the internal cavity of the lower chamber is exhausted to bring the lower chamber to the decompressed state. In this state, by operating the shaft drive unit to move the tapered shaft in the axial direction, the gap between the tapered shaft and the tapered hole is expanded, and hence the working fluid flows from the upper chamber down into the lower chamber through the gap.

Since the object that is to receive the injection is positioned directly under the tapered hole, the working fluid flowing down is dropped such that it covers the entrance of the gap of the object that is to receive the injection, and when the required quantity has been dropped, the shaft drive unit operates again to close the tapered hole by the tapered shaft. Then, the valve unit is opened in this state, and by raising the pressure in the lower chamber gradually to the atmospheric pressure, the working fluid is sucked into the gap of the object that is to receive the injection, by the press difference on the inside and outside of the object that is to receive the injection, and is injected into the interior.

In this case, according to the working fluid injection apparatus of the present invention, since it does not have a slender injection nozzle as in Patent Document 1, no undropped working fluid remains in the lower chamber, so it is possible to prevent working fluid from leaking out due to the change in the atmospheric pressure in the lower chamber. Therefore, it is possible to inject working fluid that flows in the gap between the tapered shaft and the tapered hole due to the drive of the shaft drive unit so that its quantity is measured correctly, into the object that is to receive the injection. Furthermore, when the object that is to receive the injection is positioned in the lower chamber, it can be positioned directly under the tapered hole. Therefore, it is possible to construct the apparatus and the injection process simply, and hence it is possible to reduce the cost required for the equipment and the product.

In the working fluid injection apparatus of the present invention, the construction may also be such that the object that is to receive the injection is a bearing unit which comprises a housing having an opening portion, and a shaft, which is housed in the housing, with one end exposed from the opening portion, and working fluid is injected into a gap between the housing and the shaft.

According to this construction, it is possible to inject the correct quantity of working fluid into the gap between the housing and the shaft of the bearing unit.

Moreover, in the working fluid injection apparatus of the present invention, the construction may also be such that the bearing unit is positioned vertically under the tapered hole in a state in which a cover member is mounted in a contacting state on an upper surface of the housing with a ring-shaped open portion of the gap which is formed in the opening portion, facing upwards, to thereby form above the open portion, a storage section that is communicated with the open portion and that is capable of storing working fluid.

By so doing, a storage section for temporarily storing working fluid is formed in the top of the housing by the cover member, so that it is not necessary to have a dedicated cavity in the bearing unit, and hence it is possible to inject an appropriate quantity of working fluid.

Furthermore, in the working fluid injection apparatus of the present invention, it is preferable that the shaft is provided in a state in which one end protrudes outward from the opening portion of the housing, and the storage section is formed in a ring shape between an outer peripheral surface of the protruding shaft and the cover member.

Since a screw hole or the like is normally provided for fixing another component on the upper end face of the shaft, by forming the storage section between the outer peripheral surface of the shaft and the cover member, it is possible to avoid an inconvenience of the working fluid entering the screw hole.

Moreover, in the working fluid injection apparatus of the present invention, the arrangement may also be such that the cover member is provided with a lower opening larger than the above-mentioned open portion, and a tapered inner surface that gradually widens upward from the lower opening.

By so doing, the working fluid is stored between the tapered inner surface and the shaft, and when the decompressed state is released, the working fluid is injected into the gap smoothly along the tapered inner surface.

Furthermore, in the working fluid injection apparatus of the present invention, the taper angle of the tapered inner surface may be 45° to 75° with respect to the central axis, preferably 55° to 65°, and more preferably 60°.

By so doing, it is possible to make the flow of the working fluid along the tapered inner surface smoother.

Moreover, in the working fluid injection apparatus of the present invention, there may be provided a controller that controls an inlet flow rate such that a pressure in the lower chamber is raised gradually from a decompressed state to an atmospheric pressure state over 10 to 50 seconds, preferably 20 to 40 seconds, and more preferably 25 to 35 seconds.

By the operation of the controller, the valve unit is controlled such that the pressure is raised relatively slowly from the decompressed state to the atmospheric pressure state, so that it is possible to prevent the working fluid from being injected into the gap together with the ambient air, due to rapid flow of the working fluid.

Furthermore, the present invention provides a method of injecting working fluid comprising the steps of: storing working fluid in an upper chamber of two chambers divided into top and bottom parts by a partition having a tapered hole, in a state in which a tapered shaft is inserted in the tapered hole from above to close it, and housing an object that is to receive the injection and which has a gap, in a lower chamber with the gap arranged vertically under the tapered hole; exhausting air in the upper chamber and the lower chamber to a decompressed state; moving the tapered shaft in the vertical direction to open the tapered hole, and drop the working fluid in the upper chamber so as to fill the open portion of the gap of the object that is to receive the injection in the lower chamber; inserting the tapered shaft into the tapered hole to close it; and afterward releasing the decompressed state in the lower chamber.

In the method of injecting working fluid of the present invention, the step of releasing the decompressed state may be performed gradually over 10 to 50 seconds, preferably 20 to 40 seconds, and more preferably 25 to 35 seconds.

Moreover, the present invention provides a method of manufacturing a fluid dynamic pressure bearing comprising the steps of: constructing a bearing unit by inserting a shaft in a housing with a gap formed between them, and exposing one end of the shaft from an opening portion of the housing; storing working fluid in an upper chamber of two chambers divided into top and bottom parts by a partition having a tapered hole, in a state in which a tapered shaft is inserted in the tapered hole from above to close it, and housing the bearing unit in a lower chamber with a ring-shaped open portion of the gap formed between the opening portion of the housing and the shaft being located vertically under the tapered hole; exhausting air in the upper chamber and the lower chamber to a decompressed state; moving the tapered shaft in the vertical direction to open the tapered hole, and drop the working fluid in the chamber so as to fill the open portion of the gap of the bearing unit in the lower chamber; inserting the tapered shaft into the tapered hole to close it; and afterward releasing the decompressed state in the lower chamber.

In the method of manufacturing a fluid dynamic pressure bearing of the present invention, the release of the decompressed state may be performed gradually over 10 to 50 seconds, preferably 20 to 40 seconds, and more preferably 25 to 35 seconds.

According to the present invention, no undropped working fluid remains in the lower chamber. Therefore there is an effect in that it is possible to supply the correct quantity of working fluid to an object that is to receive the injection. Furthermore, since there is no possibility of remaining working fluid leaking due to the change in the pressure in the lower chamber, and dropping into the object that is to receive the injection, which is located directly underneath, the positioning operation for the object that is to receive the injection is facilitated. Moreover, a special construction such as required to move the object that is to receive the injection into the closed lower chamber is also unnecessary. Accordingly, it is possible to simplify the construction of the apparatus and the injection process. Therefore, there is an effect in that equipment cost and manufacturing cost can be reduced.

BEST MODE FOR CARRYING OUT THE INVENTION

Hereunder is a description of an oil injection apparatus (working fluid injection apparatus) for a fluid dynamic pressure bearing according to a first embodiment of the present invention, with reference to FIG. 1 to FIG. 7.

Prior to the description of the oil injection apparatus 1 of the present embodiment, a fluid dynamic pressure bearing 3 into which oil (working fluid) 2 is injected using the oil injection apparatus 1 will be described with reference to FIG. 2.

Figure 2:
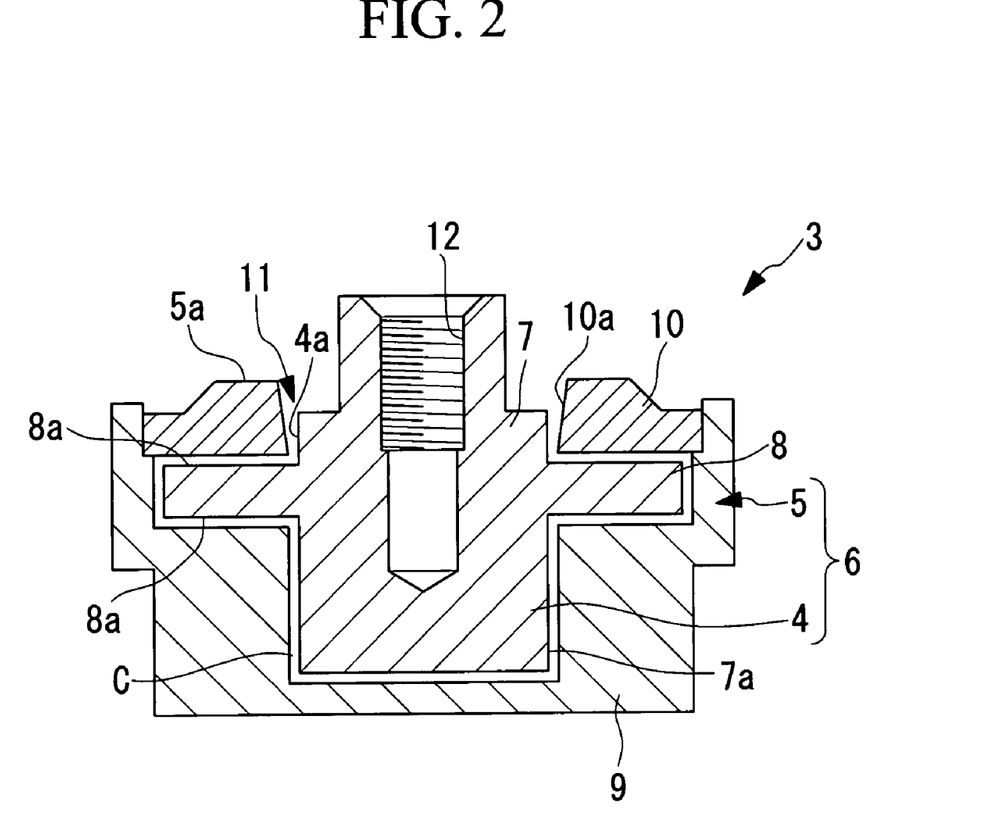
[FIG. 2] A longitudinal sectional view showing a bearing unit into which oil is injected using the oil injection apparatus of FIG. 1.

The fluid dynamic pressure bearing 3, for example as shown in FIG. 2, is provided with a bearing unit 6 comprising a shaft 4, and a housing 5 for housing the shaft 4. The shaft 4 is provided with a substantially cylindrical shaft body 7, and a flange shaped thrust bearing plate 8 that protrudes in the radial direction from an axial midway position of the shaft body 7. Dynamic pressure generating grooves (not shown in the figure) are formed on an outer peripheral surface 7a of the shaft body 7, and on two thickness direction end faces 8a of the thrust bearing plate 8. The inner surface of the housing 5 is arranged with a minute gap C which is interposed with respect to the outer peripheral surface 7a of the shaft body 7 and both end faces 8a of the thrust bearing plate 8 which are formed with the dynamic pressure generating grooves. The gap C is filled with oil 2 (refer to FIG. 6).

The housing 5 comprises a housing body 9, and a ring shaped upper plate 10 arranged so as to close an upper end opening thereof. An opening portion 10a is provided in the center of the upper plate 10, through which one end of the shaft 4 passes and protrudes outside. The opening portion 10a is formed with a tapered inner surface whose diameter increases gradually toward the outside in the axial direction from the inside of the housing 5. The gap C between the shaft 4 and the housing 5 opens to the outside via a ring-shaped open portion 11 formed between the opening portion 10a of the upper plate 10, and the shaft 4. By completely filling the gap between the shaft 4 and the housing 5 with oil 2 such that the surface of the oil is located in the open portion 11, the tapered inner surface of the opening portion 10a and the outer peripheral surface 4a of the shaft 4 form a capillary seal for holding the oil 2 by virtue of surface tension, so that it cannot leak out.

The oil injection apparatus 1 according to the present embodiment is an apparatus for injecting the oil 2 through the open portion 11 of the gap C formed between the inner surface of the opening portion 10a and the outer peripheral surface 4a of the shaft 4. The end portion of the shaft 4, which passes through the opening portion 10a of the upper plate 10 and protrudes to the outside, is provided with a fixing portion comprising a screw hole 12 for fixing, for example, a disc shaped recording medium (not shown in the figure) to the shaft 4.

Next is a description of the oil injection apparatus 1 according to the present embodiment.

Figure 1:
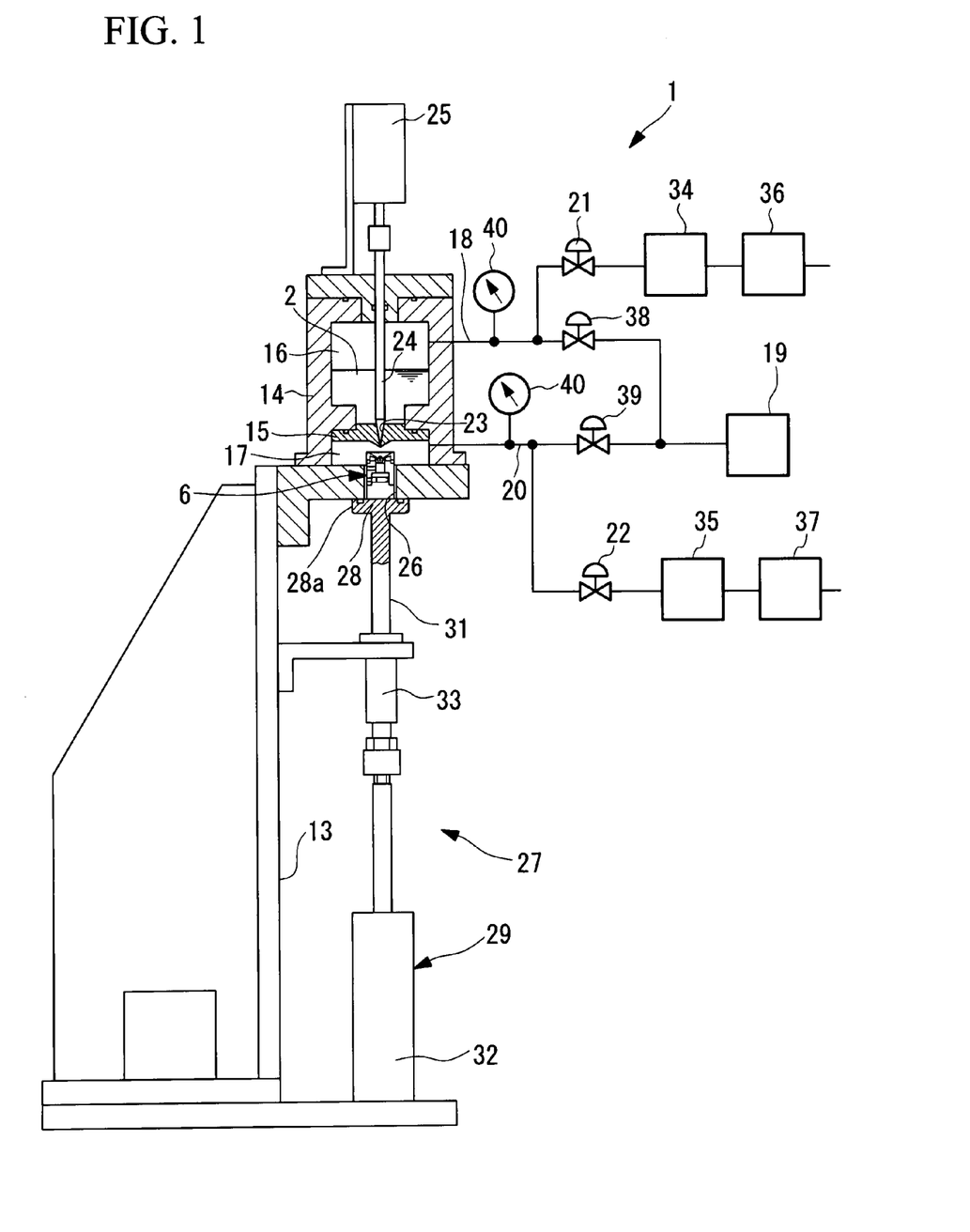
[FIG. 1] An overall structural diagram schematically showing an oil injection apparatus according to a first embodiment of the present invention.

As shown in FIG. 1, the oil injection apparatus 1 according to the present embodiment is provided with a base 13, and a casing 14 fixed on the base 13. An internal cavity of the casing 14 is divided into top and bottom parts by a partition member (partition) 15, and is provided with an upper chamber 16 for storing oil 2, and a lower chamber 17 into and out of which the bearing unit 6 can be inserted and removed.

A first exhaust system comprising a first pipe 18 and a vacuum pump 19 is connected to the upper chamber 16. Furthermore, a second exhaust system comprising a second pipe 20 and the vacuum pump 19 is connected to the lower chamber 17. Moreover, valves (valve units 21 and 22) are provided in the first pipe 18 and the second pipe 20, which respectively open and close the internal cavity of the upper chamber 16 and the lower chamber 17 relative to the external environment.

Furthermore, the oil injection apparatus 1 according to the present embodiment is provided with a tapered hole 23, which passes through the partition 15 from the top to the bottom, and forms a downward taper, a tapered shaft 24 inserted from above so as to close the tapered hole 23, and a shaft drive unit 25 for moving the tapered shaft 24 in the vertical direction. The shaft drive unit 25 comprises for example a cylinder fixed to the upper portion of the casing 14, and by operating the shaft drive unit to move the tapered shaft 24 upward, a gap is formed between the tapered shaft 24 and the tapered hole 23, so that the oil 2 stored in the upper chamber 16 can be dropped into the lower chamber 17.

Moreover, a through hole 26 is provided in the bottom face of the lower chamber 17, so that the bearing unit 6 incorporating the shaft 4 and the housing 5 can be inserted into and removed from the lower chamber 17 from below though the through hole 26. Reference symbol 27 denotes a feeder device, which inserts and removes the bearing unit 6 into and out of the lower chamber 17 by elevating a mounting base 28, on which the bearing unit 6 is mounted, using an elevation mechanism 29.

Figure 3:
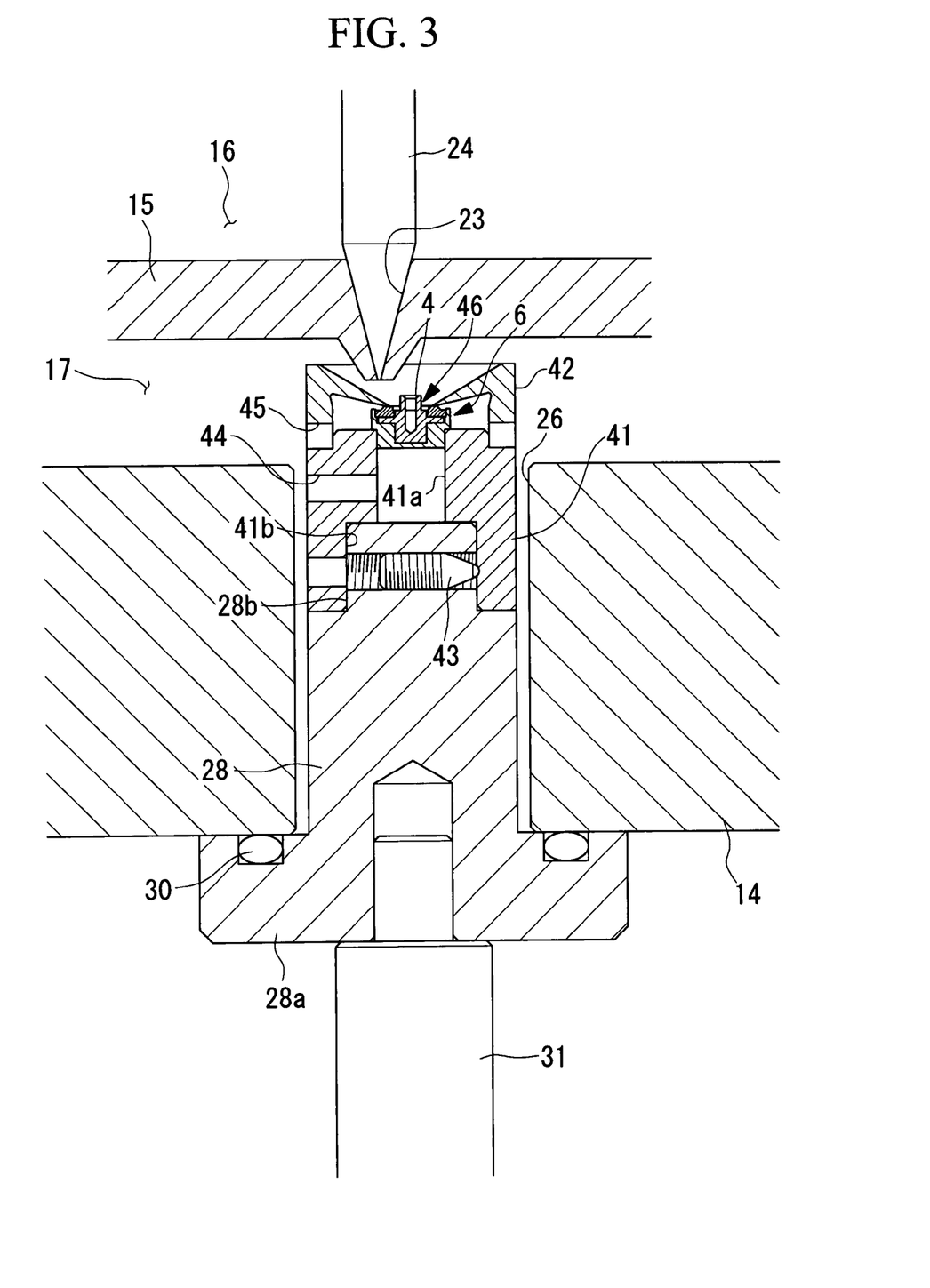
[FIG. 3] A longitudinal sectional view showing a state in which the bearing unit and a cover member are mounted onto a mounting base of the oil injection apparatus of FIG. 1, and are placed in a chamber.
Figure 4A:
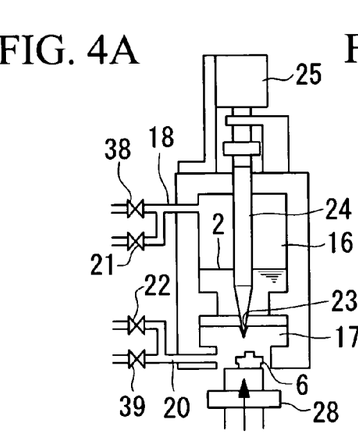
[FIG. 4] A process chart showing a step by step oil injection operation using the oil injection apparatus of FIG. 1.
Figure 4B:
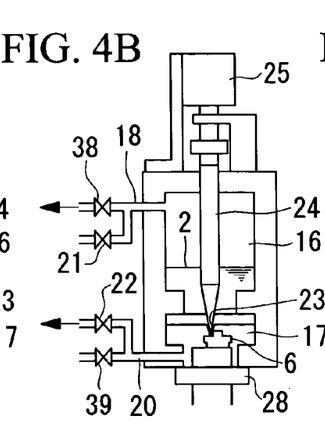
Figure 4C:
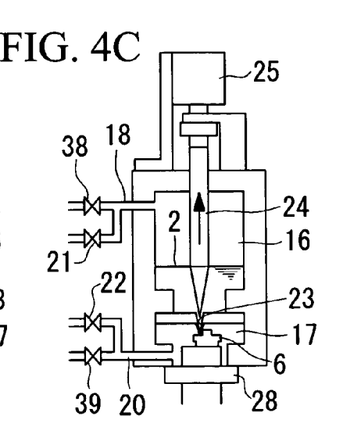
Figure 4D:
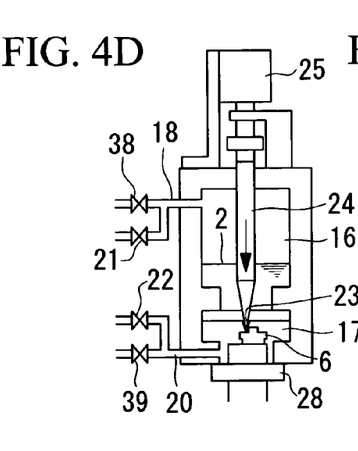
Figure 4E:
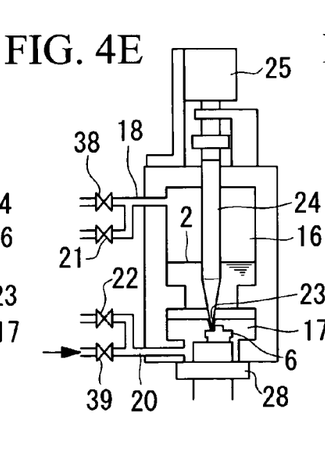
Figure 4F:
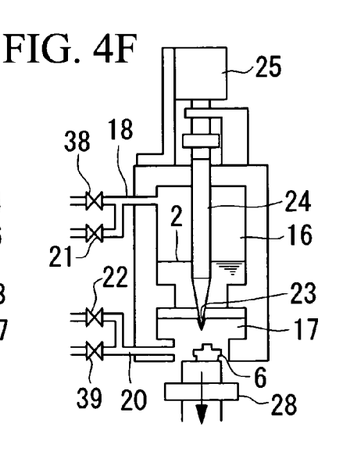

As shown in FIG. 3, a flange 28a is provided on the mounting base 28, which presses on the bottom face of the lower chamber 17 in a state in which the bearing unit 6 is inserted into the lower chamber 17. A seal member 30 such as an O-ring is provided in the flange 28a, which is compressed when the flange 28a is pressed onto the bottom face of the lower chamber 17 to seal the lower chamber 17 interior. Furthermore, the elevation mechanism 29 is provided for example with a rod 31, on the end of which the mounting base 28 is installed, a cylinder 32 for moving the rod 31 in the vertical direction, and a guide sleeve 33 for supporting the movement of the rod 31.

In the drawing, reference symbols 34 and 35 denote flow control valves (controllers) for controlling the flow rate of air sucked into the upper chamber 16 or the lower chamber 17 when the decompressed state is released, reference symbols 36 and 37 denote filters, reference symbols 38 and 39 denote valves that are closed when the inside of the upper chamber 16 or the lower chamber 17 is decompressed sufficiently by the vacuum pump 19, and reference symbol 40 denotes a pressure gage.

Moreover, as shown in FIG. 3, the bearing unit 6 is mounted on the mounting base 28 in a state in which an adapter 41 and a cover member 42 are attached. The adapter 41 is provided with a fitting hole 41a into which the outer surface of the housing 5 of the bearing unit 6 is fitted, and a locating hole 41b into which a boss 28b provided on the mounting base 28 is fitted. The bearing unit 6 is positioned such that the ring-shaped open portion 11 faces upward when it is fitted into the fitting hole 41a of the adapter 41. In the drawing, reference symbol 43 denotes a ball plunger for maintaining the state in which the adapter 41 is fitted onto the boss 28b. Furthermore, reference symbol 44 denotes a through hole for communicating the space formed in the inside of the adapter 41 with the outside of the adapter 34.

The cover member 42 is fixed to the upper portion of the adapter 41 so as to cover from above the upper portion of the bearing unit 6 which is located such that it is fitted in the fitting hole 41a of the adapter 41. As a result, the bearing unit 6 is held such that it is clamped from above and below between the adapter 41 and the cover member 42.

Figure 5:
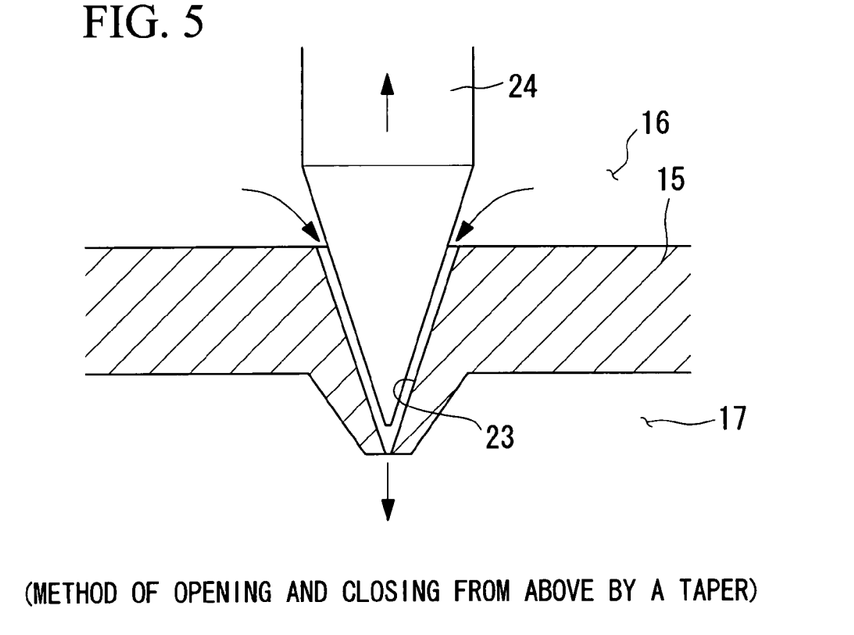
[FIG. 5] An enlarged diagram showing the state of a tapered shaft and a tapered hole when the oil injection apparatus of FIG. 1 injects oil.
Figure 6:
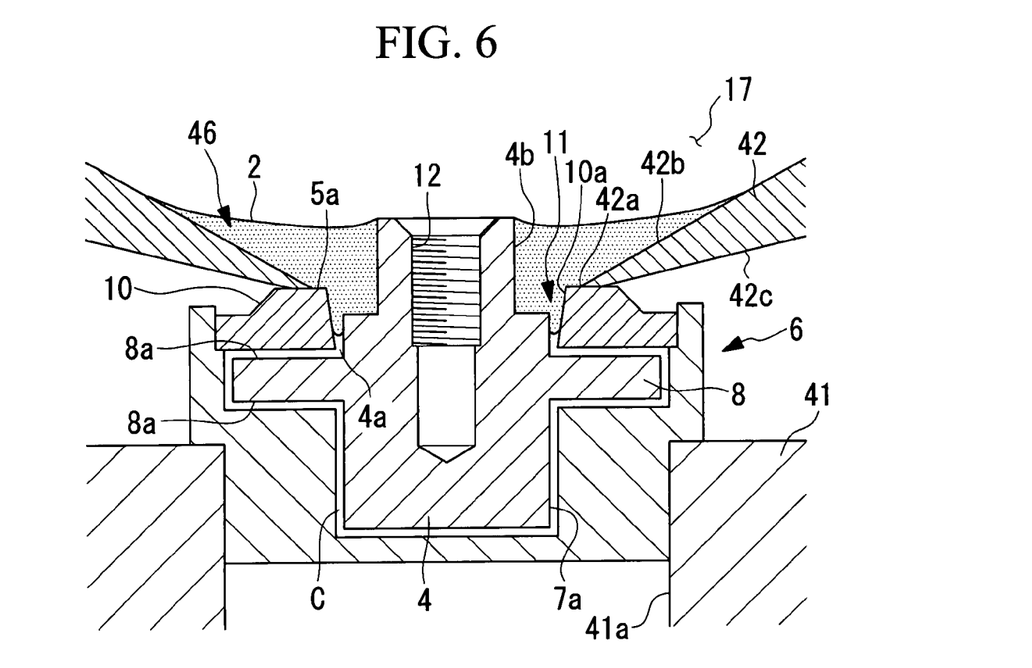
[FIG. 6] A longitudinal sectional view showing a decompressed state in which oil is stored in a storage section formed above an open portion of a gap of the bearing unit of FIG. 2.

As shown in FIG. 5 and FIG. 6, a through hole 42a which is larger than the ring-shaped open portion 11, is provided in the center of the cover member 42. Furthermore, the cover member 42 is provided with a tapered inner surface 42b, whose diameter increases gradually upward from the through hole 42a. The taper angle of the tapered inner surface 42b is for example 60° relative to the central axis. By setting the taper angle to 60°, it is possible for the oil 2 to flow smoothly along the tapered inner surface 42b toward the open portion 11 of the gap. The taper angle is not limited to 60°, and 45° to 75°, preferably 55° to 65°, may be used.

Moreover, regarding the cover member 42, as shown in FIG. 5, a rear surface 42c of the tapered inner surface 42b rises diagonally from an upper surface 5a of the housing 5. As a result, the cover member 42 only makes contact with the upper surface 5a of the housing 5 constituting the bearing unit 6, over a comparatively small annular area of the inner peripheral edge of the through hole 42a.

In FIG. 4, reference symbol 45 denotes a communicating groove for communicating the space enclosed by the cover member 42 and the adapter 41, with the outside.

When the cover member 42 is attached above the adapter 41 in a state in which the bearing unit 6 is fitted in the fitting hole 41a of the adapter 41, one end of the shaft 4 constituting the bearing unit 6, and the ring-shaped open portion 11, are exposed from above via the through hole 42a in the center of the cover member 42. Furthermore, at this time, a ring-shaped storage section 46 is formed above the open portion 11 by the outer peripheral surface 4b of the exposed shaft 4, and the tapered inner surface 42b of the cover member 42. The storage section 46 is formed such that its volume is sufficiently larger than the total volume of the gap C in the bearing unit 6.

Moreover, the tapered inner surface 42b is formed such that it is sufficiently larger than the outside diameter of the bearing unit 6. As a result, a funnel shaped guide surface, which broadens toward the periphery of the storage section 46, is formed by the tapered inner surface 42b, and even if the lower opening of the tapered hole 23 is placed at a position away from the open portion 11 in the radial direction, the oil 2 can be directed down the tapered inner surface 42b and guided to the open portion 11.

Hereunder is a description of the operation of the oil injection apparatus 1 according to the present embodiment constructed in this manner.

In order to inject the oil 2 into the gap C between the shaft 4 and housing 5 of the bearing unit 6, using the oil injection apparatus 1 according to the present embodiment, firstly, as shown in FIG. 4 (a), the tapered shaft 24 is positioned at the bottom of its travel, to close the tapered hole 23, and the oil 2 is stored in the upper chamber 16.

Next, in a situation where the bearing unit 6 is fitted in the adaptor 41 and the cover member 42 is attached above it, this assembly is mounted on the mounting base 28 by fitting the fitting hole 41b of the adapter 41 on the boss 28b of the mounting base 28. When the adapter 41 is fitted on the boss 28b, the adapter 41 is fixed by the operation of the ball plunger 43 so that it does not separate from the mounting base 28. Then, the elevation mechanism 29 is operated to raise the mounting base 28, so that the bearing unit 6 with the cover member 42 thereon is introduced into the lower chamber 17 from the through hole 26. Since the tapered hole 23 is provided in the partition 15 which is located at the ceiling in the lower chamber 17, the tapered hole 23 is positioned above the ring-shaped storage section 46 formed by the cover member 42 and the outer peripheral surface 4b of the shaft 4, as shown in FIG. 3.

When the bearing unit 6 is introduced into the lower chamber 17, the seal member 30 provided in the flange 28a of the mounting base 28 is compressed, sealing the inside of the lower chamber 17.

In this state, as shown in FIG. 4 (b), the valves 21 and 22 are closed to seal the inside of the upper chamber 16 and the lower chamber 17, the valves 38 and 39 are opened, and the vacuum pump 19 is operated to decompress the inside of the upper chamber 16 and the lower chamber 17. Through this process, air is exhausted from all of the spaces which are in communication with the inside of the lower chamber 17, such as the gap C of the bearing unit 6, and the internal cavities of the adapter 41 and the cover member 42. Moreover, the oil in the upper chamber 16 is degassed.

Then when the pressure in the lower chamber 17 reaches a predetermined decompressed state, for example approximately 70 mTorr (9.3 Pa), the shaft drive unit 25 is operated to raise the tapered shaft 24 as shown in FIG. 4 (c) and FIG. 5. As a result a gap is formed between the tapered shaft 24 and the tapered hole 23, and the oil 2 flows down into the lower chamber 17. At this time, since the pressures in the upper chamber 16 and the lower chamber 17 are set to be equal, the oil 2 descends due to gravity only, and drops into the lower chamber 17 from the lower opening of the tapered hole 23.

At this time, the dispensing rate of oil 2 is determined by the dimensions of the gap formed between the tapered shaft 24 and the tapered hole 23, and the temperature of the oil 2. Accordingly, by adjusting the displacement of the tapered shaft 24 by the shaft drive unit 25, and controlling the temperature of the oil 2, it is possible to accurately determine the quantity dispensed, using the time that the tapered shaft 24 is positioned in the raised position.

Then, as shown in FIG. 4 (d), after a predetermined time has elapsed, by operating the shaft drive unit 25 to lower the tapered shaft 24 and close the tapered hole 23, an appropriate amount of the oil 2 is stored in the storage section 46 as shown in FIG. 6, and the ring-shaped open portion 11 is closed by the oil 2. At this time, the pressures in the gap C in the housing 5, and the lower reservoir 17 are in equilibrium, and hence the oil 2 does not enter the gap C due to surface tension, and it remains stored in the storage section 46.

Next, as shown in FIG. 4 (e), by opening the valve 22 in the state in which the valve 39 is closed and the lower chamber 17 is sealed, the decompressed state in the lower chamber 17 is released. At this time, by the operation of the flow control valve 35, the decompressed state in the lower chamber 17 is released slowly so as to revert to the atmospheric pressure state, for example, taking about 30 seconds.

As the decompressed state in the lower chamber 17 becomes released, the internal pressure of the lower chamber 17 increases gradually. However, since the open portion 11 of the bearing unit 6 is closed by the oil 2, the gap C is maintained in a decompressed state. As a result, due to the difference in pressure between the inside and the outside of the housing 5, the oil 2 stored in the storage section 46 is sucked into the gap C through the open portion 11.

Figure 7:
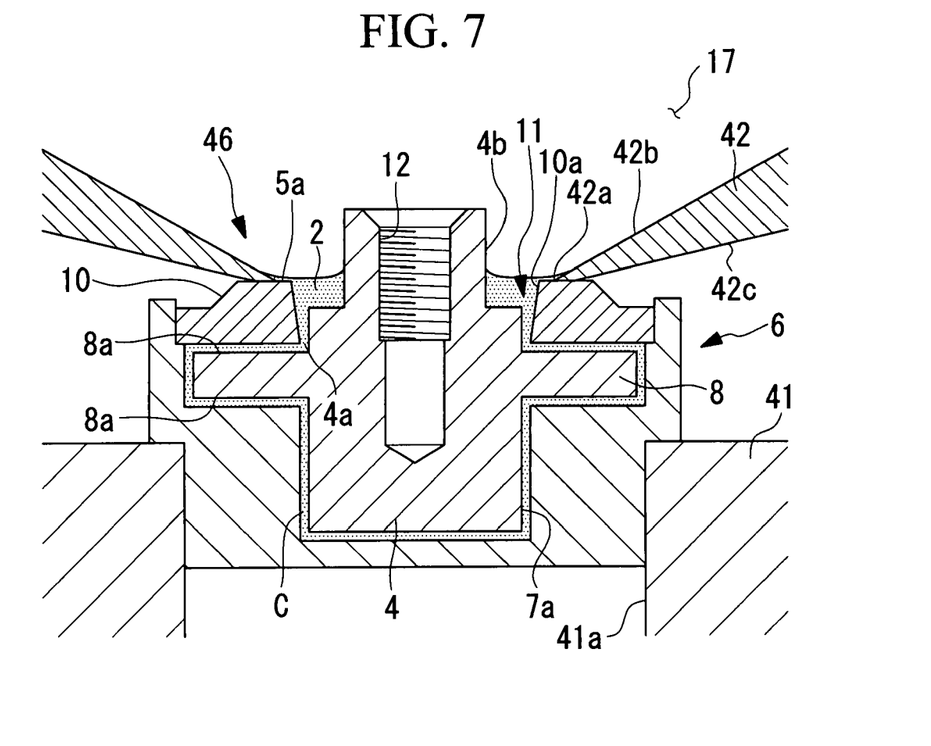
[FIG. 7] A longitudinal sectional view showing a state in which the decompressed state of FIG. 6 is released.

In this case, since the total volume of the gap C is sufficiently small, the amount of air left inside is extremely small, so that it does not remain as bubbles after the oil 2 is injected. Furthermore, since the amount of oil 2 stored in the storage section 46 is sufficiently larger than the total volume of the gap C, even if it is injected into the whole of the gap C, there is still some remaining in the storage section 46 as shown in FIG. 7. Accordingly, there is no possibility of the oil 2 in the storage section 46 becoming depleted and air being sucked into the gap C during injection into the gap C.

After completion of the injection into the gap C, as shown in FIG. 4 (f), the elevating mechanism 29 operates to lower the mounting base 28, and the fluid dynamic pressure bearing 3 produced by injecting the oil 2, is removed from the lower chamber 17. The excess oil 2 remaining in the storage section 46 can be removed easily by a suction device (not shown in the figure) such as a syringe.

In this manner, in the oil injection apparatus 1 according to the present embodiment, the storage section 46 is formed by the cover member 42 mounted on the bearing unit 6, for storing the oil 2 temporarily above the open portion 11 of the gap C. Therefore it is not necessary to form a cavity for storing the oil 2, in the shaft 4 or the housing 5 constituting the bearing unit 6, and it is possible to supply the oil 2 to the gap C in a required amount to fill the overall gap C. Accordingly, it is not necessary to provide an unproductive cavity shape in the shaft 4 or the housing 5 that has no function when used as a bearing. In particular, in the case of a fluid dynamic pressure bearing 3 for a compact magnetic disc in which there is no spare space to install a wasteful structure in its design, there is an advantage in that wastefulness can be eliminated to make the design compact.

Moreover, in the oil injection apparatus 1 according to the present embodiment, when the tapered hole 23 formed in the partition 15 is closed by the tapered shaft 24, very little undropped oil 2 remains in the lower chamber 17. Therefore, when after the oil 2 is injected, a new bearing unit 6 is placed in the lower chamber 17 and the pressure is lowered, there is no concern about remaining oil leaking and dropping onto the bearing unit 6. Accordingly, when by the operation of the elevation mechanism 29, the bearing unit 6 mounted on the mounting base 28 is placed in the lower chamber 17, it is possible to position it directly below the tapered hole 23 from the beginning. Therefore, it is possible to construct the apparatus body easily, and it is not necessary to use a complicated mechanism or a complicated process, such as for moving the bearing unit 6 into the lower chamber 17 in a sealed and decompressed state. Thus it is possible to reduce the production time and the cost.

Furthermore, in a conventional dispenser, when the fluid is dropped, or when the fluid in the dispenser is replenished from a reservoir tank, bubbles appear on the inside easily, and it is difficult to remove the bubbles. Whereas in the oil injection apparatus 1 according to the present embodiment, by means of the upper chamber serving as both a reservoir tank and a dispenser, it becomes difficult for bubbles to get mixed in the oil.

Moreover, due to the shape of the cover member 42 mounted on the upper surface 5a of the housing 5, it is possible to set the volume of the storage section 46 formed between the tapered inner surface 41b and the outer peripheral surface 4b of the shaft 4 to be sufficiently larger than the total volume of the gap C in the housing 5. Therefore, it is possible to more reliably prevent the oil 2 inside the storage section 46 from becoming insufficient part way through the injection, and air being intermixed in the gap C.

Furthermore, since the oil 2 is stored in the storage section 46 in a state in which the air in the gap C in the housing 5 is sucked out in advance, air is not confined to the housing 5 when the decompressed state is released. Therefore, it is possible to prevent a phenomenon from occurring whereby confined air turns to bubbles and is released from the open portion 11. As a result, it is possible to fill the entire gap C with the oil 2 without splashing over the surroundings.

Moreover, since the decompressed state in the lower chamber 17 is released slowly over about thirty seconds, when the oil 2 stored in the storage section 46 is sucked into the gap C in the housing 5, the surrounding air is not involved. Therefore it is possible to prevent air from contaminating the gap C, more reliably. The time taken for the decompressed state to be released is not limited to 30 seconds, and may be 10 to 50 seconds, preferably 20 to 40 seconds, and more preferably 25 to 35 seconds.

Furthermore, since the oil 2 stored in the storage section 46 is sufficiently degassed in the upper chamber 16, there is an advantage in that when the bearing is used it is difficult for bubbles to be generated at the time of a negative pressure state, for example, when generating a dynamic pressure.

Moreover, the cover member 42 mounted on the upper surface of the housing 5 is not in contact with the whole of the upper surface 5a of the housing 5, but only makes contact with the ring-shaped contact part having a predetermined width, and the rear surface 42c of the tapered inner surface 42b is separated from the upper surface 5a of the housing 5 by a predetermined angle. Therefore, spreading of the oil 2 from the storage section 46 is limited to the ring-shaped contact part, and thus it is possible to prevent an inconvenience from occurring such as excessive leakage, for example leakage to the outer peripheral surface of the housing 5.

Furthermore, in the present embodiment, the ring-shaped storage section 46 is provided between the tapered inner surface 42b of the cover member 42 and the outer peripheral surface 4b of the shaft 4 protruding from the opening portion 10a of the housing 5, and the oil 2 is stored therein. Therefore it is possible to prevent the oil 2 from entering the screw hole 12 for the fixed part, formed in the end of the shaft 4. The screw hole 12 must be degreased in order to prevent loosening, and by preventing the oil 2 from entering the screw hole 12, it is possible to omit the degreasing process, which improves efficiency. In particular, when the oil 2 in the storage section 46 is injected into the gap C, bubbles are not generated from the gap C. Therefore, there is also no possibility of the oil 2 in the storage section 46 leaking and entering the screw hole 12.

Note that in the case where the end of the shaft 4 is only exposed and does not protrude from the opening portion 10a of the housing 5, the storage section 46 may be formed over the entire inside of the tapered inner surface 42b of the cover member 44.

Moreover, in the above-described embodiment, 70 mTorr is described as an example of a decompressed state. However, the invention is not limited to this. Furthermore, the bearing unit 6 into which the oil 2 is injected, is described using a type that has a thrust bearing plate 8 at an axial midway position. However, the present invention is not limited to this, and it is possible to apply it to any type of sealed fluid dynamic pressure bearing of other optional forms having an open portion 11 of a gap C on one end.

Figure 8:
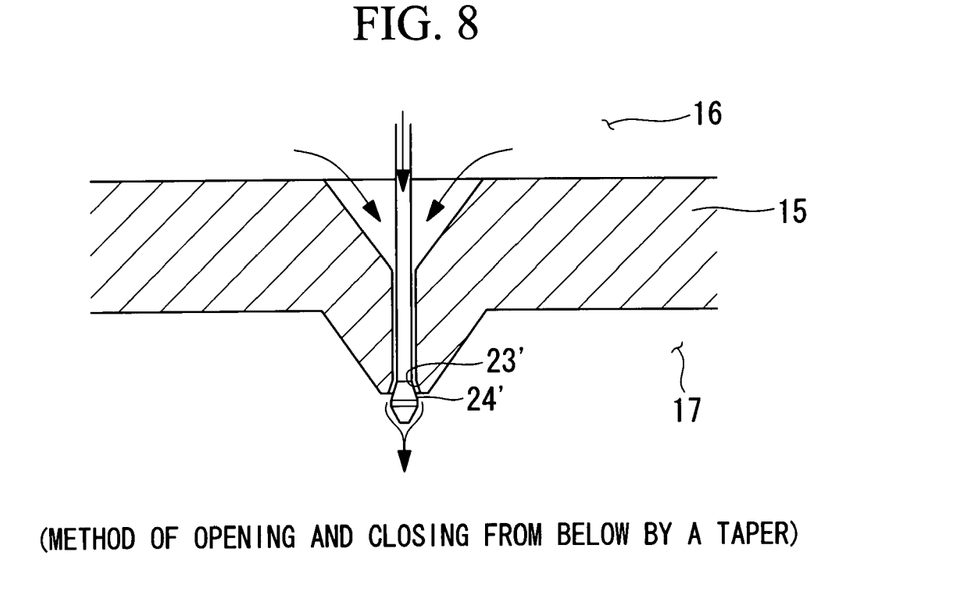
[FIG. 8] An enlarged diagram of a tapered shaft and a tapered hole showing a modified example of the oil injection apparatus of FIG. 1.

Moreover, in the present embodiment, a case is described in which a tapered shaft 24, which is lowered to close a tapered hole 23 provided in a partition 15 that tapers toward the lower side, is inserted into the tapered hole 23. However, alternatively, as shown in FIG. 8, a tapered hole 23' that tapers upward, and a tapered shaft 24' with a tapered outer surface that is inserted into the tapered hole 23' and raised to close it, may also be used.

Figure 9:
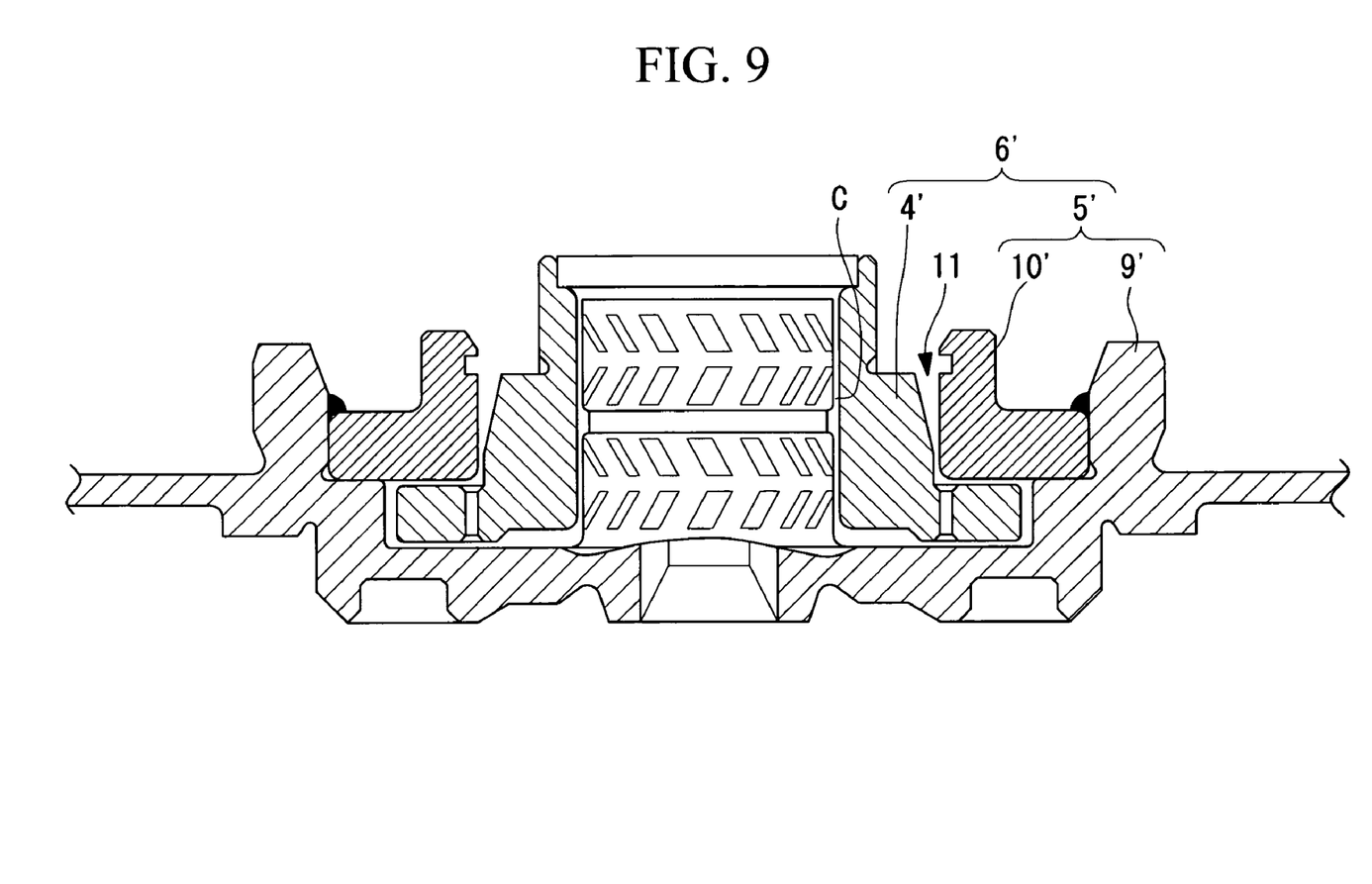
[FIG. 9] A longitudinal sectional view showing another example of a bearing unit into which oil is injected using the oil injection apparatus of FIG. 1.

Furthermore, in the present embodiment, a case is described in which the oil 2 is injected into the gap between the housing 5 and the shaft 4 of the bearing unit 6 in which the shaft 4 rotates in the fixed housing 5. However, alternatively, as shown in FIG. 9, the invention may be applied to a bearing unit 6' in which a housing 5' rotates inside a fixed shaft 4'. In the figure, reference symbol 9' denotes a housing body, and reference symbol 10' denotes an upper plate.

Moreover, in the present embodiment, an example is described in which, when oil is injected into the gap C of the bearing unit 6, a cover member 42 is used. However, alternatively, the oil may be supplied to the open portion 11 of the gap C of the bearing unit 6 directly from the tapered hole 23 of the partition 15, without using the cover member 42.

Figure 10:
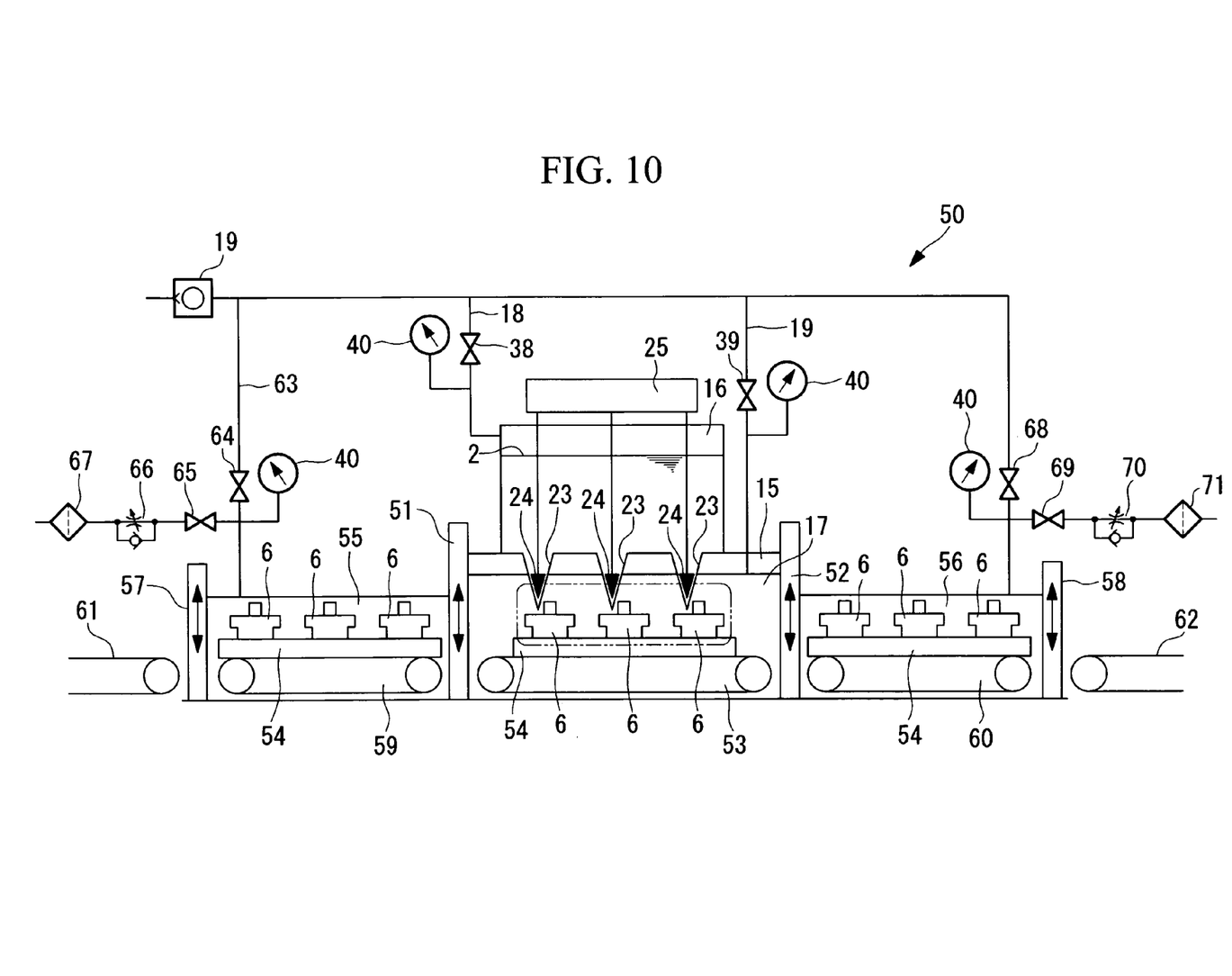
[FIG. 10] A schematic diagram showing an oil injection apparatus according to a second embodiment of the present invention.

Next is a description of an oil injection apparatus 50 according to a second embodiment of the present invention, with reference to FIG. 10.

In the description of the present embodiment, the same reference symbols are used for parts common to the structure of the oil injection apparatus 1 according to the first embodiment, and their descriptions are omitted.

As shown in FIG. 10, the oil injection apparatus 50 according to the present embodiment is provided with an upper chamber 16 and a lower chamber 17, divided into top and bottom parts by a partition 15. The partition 15 has three tapered holes 23, and tapered shafts 24 are inserted into the tapered holes 23. The tapered shafts 24 are arranged such that they can be raised and lowered by a shaft drive unit 25.

The lower chamber 17 is provided with doors 51 and 52, both of which can be opened and closed, on the upstream side and the downstream side of the conveying direction. Inside is provided a conveyer unit 53 which can convey a plurality of, for example three, bearing units 6 from the door 51 on the upstream side to the door 52 on the downstream side. On the conveyer unit 53 is mounted a tray 54, onto which the bearing units 6 are loaded so as to be positionable at a spacing to match the spacing between the tapered holes 23.

Furthermore, the oil injection apparatus 50 according to the present embodiment is provided with an entrance side chamber 55 adjacent to but apart from the upstream side door 51 of the lower chamber 17, and an exit side chamber 56 adjacent to but apart from the downstream side door 52. An entrance door 57 is provided on the upstream side of the entrance side chamber 55, and an exit door 58 is provided on the downstream side of the exit side chamber 56. Conveyer units 59 and 60, which can convey the bearing units 6 loaded on the trays 54, are provided in the entrance side chamber 55 and in the exit side chamber 56 respectively. Moreover, conveyer units 61 and 62 are provided on the further upstream side of the entrance door 57 and the further downstream side of the exit door 58 respectively.

Regarding the entrance side chamber 55, the internal cavity can be sealed or opened with respect to the outside, by the entrance door 57 and the upstream side door 51 of the lower chamber 17. Furthermore, for the exit side chamber 56 also, the internal cavity can be sealed or opened with respect to the outside by the exit door 58 and the downstream side door 52 of the lower chamber 17.

Moreover, the entrance side chamber 55 is connected to a vacuum pump 19 by a third pipe 63 via a valve 64, and is opened to the atmosphere via a valve 65, a flow control valve 66, and a filter 67. Furthermore, the exit side chamber 56 is connected to the vacuum pump 19 by a fourth pipe 68 via a valve 65, and is opened to the atmosphere via a valve 69, a flow control valve 70, and a filter 71.

Hereunder is a description of the operation of the oil injection apparatus 50 according to the present embodiment constructed as above.

In order to inject the oil 2 into the gaps of bearing units 6 using the oil injection apparatus 50 according to the present embodiment, firstly, before bringing the bearing units 6 into the apparatus, the doors 51 and 52 are closed to seal the lower chamber 17, and the vacuum pump 19 is operated with the valves 38 and 39 opened so that the upper chamber 16 and the lower chamber 17 are brought to a decompressed state. As a result, the oil 2 in the upper chamber 16 is maintained in a degassed state.

Next, the entrance door 57 is opened so that the entrance side chamber 55 is open to the atmosphere, three bearing units 6 loaded on the tray 54, which is conveyed by the conveyer unit 61, are moved to the conveyer unit 59 in the entrance side chamber 55 by the tray 54, and are carried into the entrance side chamber 55. Then, the entrance door 57 and the valve 65 are closed to seal the entrance side chamber 55, and by operating the vacuum pump 19 with the valve 64 open, the entrance side chamber 55 is brought to the same decompressed state as the lower chamber 17. By so doing, the air in the bearing units 6 is exhausted.

In this state, the door 51 is opened to communicate between the entrance side chamber 55 and the lower chamber 17. Then, the conveyer units 59 and 53 are operated to carry the tray 54 on which the bearing units 6 are loaded into the lower chamber 17, and locate each of the bearing units 6 directly under one of the tapered holes 23, and the door 51 is then closed. The shaft drive unit 25 is then operated to raise the tapered shafts 24, and the oil 2 in the upper chamber 16 is supplied to the bearing units 6.

At this time, coincident with the injection of the oil 2, by operating the vacuum pump 19 with the valve 68 open, the exit side chamber 55 is brought to the same decompressed state as the lower chamber 17.

When the injection of the oil 2 is completed, the shaft drive unit 25 is operated to lower the tapered shafts 24, and close the tapered holes 23. Afterward, the conveyer units 53 and 60 are operated with the door 52 open, to carry the bearing units 6 loaded on the tray 54 into the exit side chamber 56.

When the bearing units 6 are carried into the exit side chamber 56, the door 52 is closed, the internal cavity is sealed, and the valve 68 is closed. Meanwhile, the valve 69 is opened so that the exit side chamber 56 is opened to the atmosphere. At this time, the opening to the atmosphere is performed gradually over a period of time by the flow control valve 70, so the oil 2 supplied to the bearing units 6 penetrates into the gaps between the shafts 4 and the housings 5 gradually. Once the exit side chamber 56 has been opened to the atmosphere, the conveyer units 60 and 62 are operated with the exit door 58 open, and the bearing units 6 in which the oil 2 has been injected are output.

Since it takes a relatively long time from opening the exit side chamber 56 to the atmosphere, until output of the bearing units 6, then at the same time, the entrance side chamber 55 is opened to the atmosphere by opening the valve 65, new bearing units 6 are carried into the entrance side chamber 55 with the entrance door 57 open, and the entrance side chamber 55 is decompressed by closing the valve 65 and opening the valve 64.

After this, the above-described processing is repeated.

As described above, the entrance side chamber 55 and the exit side chamber 56 are located adjacent to the lower chamber 17 in which the oil 2 is injected, and the decompression operation and opening to the atmosphere, which are performed by the lower chamber 17 in the first embodiment, are shared by the entrance side chamber 55 and the exit side chamber 56. Thus it is possible to complete preparation for the injection of the oil 2 into the next bearing units 6, during the opening to the atmosphere, which requires a relatively long time. Accordingly, the operation is performed efficiently, and it is possible to manufacture a large quantity of bearing units 6 continuously.

In the above-described embodiment, a case is described in which three bearing units 6 are processed at the same time. However, the invention is not limited to this, and the operation can also be performed efficiently for any case of one or more.

The invention claimed is:

1. A working fluid injection apparatus comprising:
   an upper chamber that stores a working fluid;
   a lower chamber for removably receiving a bearing unit having a housing and a shaft that is inserted in the housing to form, between the shaft and the housing, a gap into which the working fluid is to be injected;
   a partition that divides the upper chamber and the lower chamber into top and bottom parts, respectively;
   a first exhaust system that brings the inside of the upper chamber to a decompressed state;
   a second exhaust system that brings the inside of the lower chamber to a decompressed state;
   a valve unit that opens and closes an internal cavity of the lower chamber relative to an external environment;
   a tapered hole formed in the partition and communicating the upper and lower chambers to one another;
   a tapered shaft inserted into the tapered hole from the upper chamber; and
   a shaft drive unit that moves the tapered shaft in the axial direction in the tapered hole.

2. A working fluid injection apparatus according to claim 1; wherein the housing of the bearing unit has an opening portion housing the shaft with one end of the shaft being exposed from the opening portion.

3. A working fluid injection apparatus according to claim 2; wherein the bearing unit is positioned vertically under the tapered hole in a state in which a cover member is mounted in a contacting state on an upper surface of the housing with a ring-shaped open portion of the gap which is formed in the opening portion facing upwards to thereby form above the open portion a storage section that communicates with the open portion and that is configured to store the working fluid.

4. A working fluid injection apparatus according to claim 3; wherein the shaft is provided in a state in which one end protrudes outward from the opening portion of the housing; and wherein the storage section is formed in a ring shape between an outer peripheral surface of the protruding shaft and the cover member.

5. A working fluid injection apparatus according to claim 3; wherein the cover member has a lower opening larger than the open portion of the gap, and has a tapered inner surface that gradually widens upward from the lower opening.

6. A working fluid injection apparatus according to claim 5; wherein the tapered inner surface of the cover member has a taper angle in the range of 45° to 75° with respect to a central axis of the cover member.

7. A working fluid injection apparatus according to claim 6; wherein the taper angle is in the range of 55° to 65° with respect to the central axis of the cover member.

8. A working fluid injection apparatus according to claim 7; wherein the taper angle is 60° with respect to the central axis of the cover member.

9. A working fluid injection apparatus according to claim 1; further comprising a controller that controls an inlet flow rate such that a pressure in the lower chamber is raised gradually from a decompressed state to an atmospheric pressure state over 10 to 50 seconds.

10. A working fluid injection apparatus according to claim 9; wherein the controller controls the inlet flow rate such that the pressure in the lower chamber is raised gradually from the decompressed state to the atmospheric pressure state over 20 to 40 seconds.

11. A working fluid injection apparatus according to claim 10; wherein the controller controls the inlet flow rate such that the pressure in the lower chamber is raised gradually from the decompressed state to the atmospheric pressure state over 25 to 35 seconds.

12. A method of injecting working fluid comprising the steps of:
   providing a bearing unit having a housing and a shaft that is inserted in the housing to form between the shaft and the housing a gap into which the working fluid is to be injected;
   storing the working fluid in an upper chamber of two chambers divided into the upper chamber and a lower chamber by a partition having a tapered hole, in a state in which a tapered shaft is inserted in the tapered hole from above to close it, and housing the bearing unit in the lower chamber with the gap of the bearing unit arranged vertically under the tapered hole;
   exhausting air from each of the upper chamber and the lower chamber to place the upper and lower chambers in a decompressed state;
   moving the tapered shaft in the vertical direction to open the tapered hole and to drop the working fluid in the upper chamber so as to fill an open portion of the gap of the bearing unit;
   inserting the tapered shaft into the tapered hole to close it; and thereafter releasing the decompressed state in the lower chamber.

13. A method of injecting working fluid according to claim 12; wherein the releasing step is performed gradually over 10 to 50 seconds.

14. A method of injecting working fluid according to claim 13; wherein the releasing step is performed gradually over 20 to 40 seconds.

15. A method of injecting working fluid according to claim 14; wherein the releasing step is performed gradually over 25 to 35 seconds.

16. A method of manufacturing a fluid dynamic pressure bearing comprising the steps of:
   constructing a bearing unit by inserting a shaft in a housing with a gap formed between the shaft and the housing, and exposing one end of the shaft from an opening portion of the housing;
   storing a working fluid in an upper chamber of two chambers divided into the upper chamber and a lower chamber by a partition having a tapered hole, in a state in which a tapered shaft is inserted in the tapered hole from above to close it, and housing the bearing unit in the lower chamber with a ring-shaped open portion of the gap formed between the opening portion of the housing and the bearing unit shaft being located vertically under the tapered hole;
   exhausting air from each of the upper chamber and the lower chamber to place the upper and lower chambers in a decompressed state;
   moving the tapered shaft in the vertical direction to open the tapered hole, and dropping the working fluid in the lower chamber so as to fill the open portion of the gap of the bearing unit in the lower chamber;
   inserting the tapered shaft into the tapered hole to close it; and thereafter releasing the decompressed state in the lower chamber.

17. Method of manufacturing a fluid dynamic pressure bearing according to claim 16; wherein the releasing step is performed gradually over 10 to 50 seconds.

18. A method of manufacturing a fluid dynamic pressure bearing according to claim 17; wherein the releasing step is performed gradually over 20 to 40 seconds.

19. A method of manufacturing a fluid dynamic pressure bearing according to claim 18; wherein the releasing step is performed gradually over 25 to 45 seconds.

* * * * *